(12) United States Patent
Kao et al.

(10) Patent No.: US 11,763,384 B2
(45) Date of Patent: *Sep. 19, 2023

(54) SYSTEM AND METHOD FOR MULTI-LEVEL CONTAINER SEQUENCING

(71) Applicant: Episode Six Inc., Austin, TX (US)

(72) Inventors: Futeh Kao, Austin, TX (US); John Mitchell, Austin, TX (US); Chermaine Hu, New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/665,494

(22) Filed: Feb. 5, 2022

(65) Prior Publication Data

US 2022/0156838 A1    May 19, 2022

Related U.S. Application Data

(63) Continuation of application No. 15/623,386, filed on Jun. 15, 2017, now Pat. No. 11,244,395, which is a continuation of application No. 15/608,974, filed on May 30, 2017, now abandoned.

(51) Int. Cl.
*G06Q 20/36* (2012.01)
*G06Q 40/04* (2012.01)

(52) U.S. Cl.
CPC ............. *G06Q 40/04* (2013.01); *G06Q 20/36* (2013.01)

(58) Field of Classification Search
CPC ................................ G06Q 40/04; G06Q 20/36
See application file for complete search history.

(56) References Cited

U.S. PATENT DOCUMENTS

| 10,546,289 | B1* | 1/2020 | Maeng | G06Q 20/32 |
| 2015/0066691 | A1* | 3/2015 | Ready | G06Q 30/0641 |
| | | | | 705/26.8 |
| 2015/0254770 | A1* | 9/2015 | Bondesen | G06Q 40/04 |
| | | | | 705/37 |
| 2016/0180332 | A1* | 6/2016 | Wilczynski | G06Q 20/36 |
| | | | | 705/41 |
| 2017/0024728 | A1* | 1/2017 | Bull | G06Q 40/10 |
| 2017/0061427 | A1* | 3/2017 | Sharma | G06Q 20/363 |

OTHER PUBLICATIONS

Daswani, "SWAPEROO: A Simple Wallet Architecture for Payments, Exchanges, Refunds, and Other Operations", Proceedings of the 3rd USENIX Workshop on Electronic Commerce Boston, Massachusetts, Aug. 31-Sep. 3, 1998. (Year: 1998).*

* cited by examiner

*Primary Examiner* — Abdulmajeed Aziz
(74) *Attorney, Agent, or Firm* — Marin Patents LLC; Gustavo Marin

(57) ABSTRACT

A preferred embodiment of the invention allows the designation, configuration and rearrangement of multiple value unit wallets that allow an end user to designate which types of value units in conjunction with an algorithmic sequence to create a transaction product account may be implemented on a per-transaction basis such that a utilization product determines how a transaction may be processed on a transaction-by-transaction basis. The utilization product may be controllable via an application programming interface to select alternate sequences whereby prioritization of different types of value units may be designated on a transaction-by-transaction basis.

7 Claims, 18 Drawing Sheets

SYSTEM AND METHOD FOR MULTI-LEVEL CONTAINER SEQUENCING

CROSS REFERENCE TO RELATED APPLICATIONS

This application is a continuation to U.S. patent application Ser. No. 15/623,386, titled "SYSTEM AND METHOD FOR VALUE UNIT CONVERSION AND UTILIZATION", which was filed on Jun. 15, 2017, which is a continuation-in-part of U.S. patent application Ser. No. 15/608,974, titled "SYSTEM AND METHOD FOR CREATING A TRANSACTION PRODUCT APPLICATION PROGRAMMING INTERFACE THAT INTERACTS WITH BOTH A TRANSACTION NETWORK AND COMMUNICATIONS NETWORK", which was filed on May 30, 2017, the specifications of which are hereby incorporated by reference in its entirety.

FIELDS OF THE INVENTION

The disclosure as detailed herein is in the technical field of transactional systems. More specifically, the present disclosure relates to the technical field of end user configured application programming interfaces. Even more specifically, the present disclosure relates to the technical field of exchange systems for transactions.

DESCRIPTION OF RELATED ART

Currently, banks and other payment product issuers have financial instruments and transaction products that they offer to their customers. These include personal or business checking, savings and borrowing accounts with different functionalities as well as terms and conditions, payment products and functionalities such as electronic and wire transfers, online bill payments, debit and credit cards, person-to-person transfers and others. These financial instruments and transaction products are valuable tools banks, issuers and other companies offer to their customers.

When a consumer initiates a transaction using a payment product, the acquirer receiving the transaction creates a transaction message which includes details of the transaction requirements and the payment product which identify the issuer and the customer account of the product. The payment transaction message is transmitted via a switch into the transaction network where it is routed to the issuer processor of the particular issuer and particular account associated with the transaction. Once the transaction gets to the issuer processor, the issuer processor receives the payment transaction details and examines the account associated with the message to see if the transaction requirements can be met, then authorizes the transaction if the requirements can be met. A response message is then sent from the issuer processor back to the switch, which then passes the response message to the acquirer which would approve or decline the transaction at the point of sale.

Currently, there are few means for customizing the interaction that a consumer or company might desire on a per transaction basis. One of the existing means, for example, is that rules can be established by the issuer that set limits per day on the amount of transaction for a particular payment product. However, these rules that would regulate the types of features that may exist for a transaction are typically hard coded into software at particular issuing institutions. These hard-coded software is then often used to provide financial products to end users in order to be competitive on the market.

What is needed is a configurable transformation engine used by an issuing institution to receive configurable input and transform this data into one or more end user accessible application programming interfaces that can be used to create one or more transaction products. This would allow significantly more transaction products to be conceived, created, and allow for multiple end user applications to be created for one or more APIs generated as transaction products.

General Summary of the Invention

This invention is a platform that allows banks, issuers and other companies to create financial instruments and transaction products using a control console. Further, the control console accepts transaction product input as a means to configure a transaction product that can be offered to end users. The platform has a product engine that accepts these parameters and builds an application programming interface transaction product, that allows an end user to manage and configure aspects of the transaction product and value unit transactions at the product level and on a per-transaction basis (once an end user application is built for the product).

Further, this invention contemplates one type of transaction product called a value unit conversion and utilization product, which allows the designation and manipulation of multiple value unit wallets that allow an end user to designate which types of value units in a transaction product account may be implemented on a per-transaction basis such that a person may perform a transaction in one value unit and settle it using another. The creation of the transaction product specifically may decrease the fees associated with value unit exchange.

In addition, the value unit conversion and utilization product is contemplated to have multiple interfaces where a person may select alternate sequences of value unit withdrawal such that an end user may prioritize the different types of value units that are withdrawn from an account during a transaction.

Further, a preferred embodiment of the invention contemplates an exchange processor that interacts with one or more value unit exchanges in order to create value unit conversion rates for value units across multiple value unit exchanges (as integrations). This allows the nominal usage of multiple types of value unit exchanges such as digital currencies (e.g. bitcoin), fiat currency, consumer rewards (e.g. loyalty points) and other types of value units to be used on a per-transaction basis by an end user.

DETAILED DESCRIPTION

Figure 1:
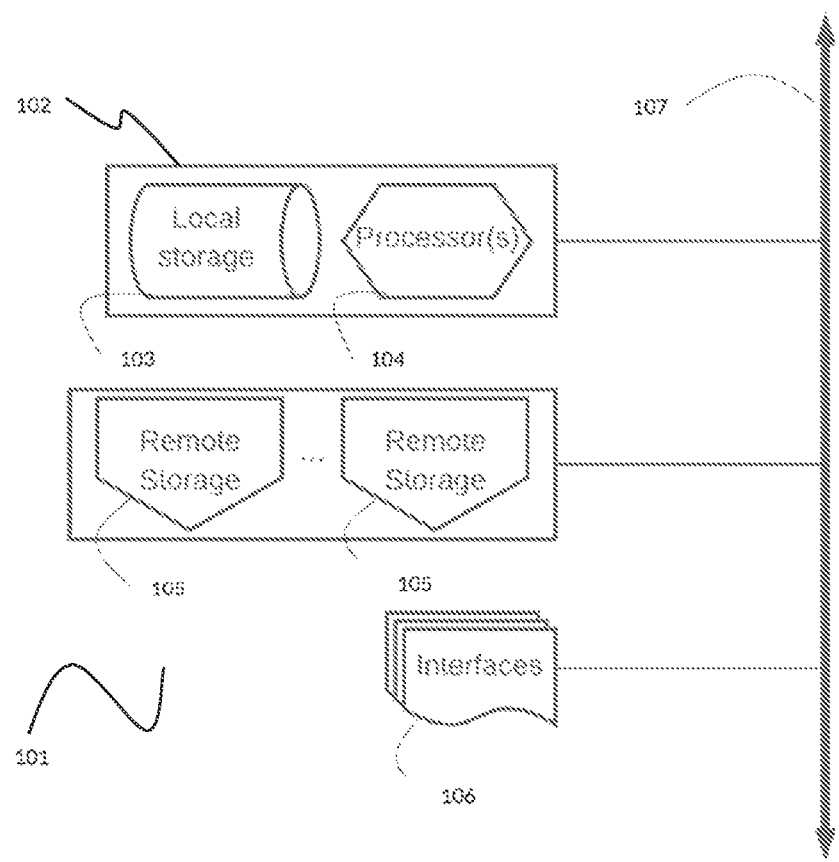
FIG. 1 is a perspective view, which shows an exemplary hardware architecture of a computing device used in an embodiment of the invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations.

Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step).

Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be appreciated that particular embodiments may include multiple iterations of a technique or multiple instantiations of a mechanism unless noted otherwise.

Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented.

According to specific embodiments, at least some of the features or functionalities of the various embodiments disclosed herein may be implemented on one or more general-purpose computers associated with one or more networks, such as for example an end-user computer system, client computer, network server or other server system, mobile computing device (e.g., tablet computing device, mobile phone, smartphone, laptop, or other appropriate computing device), consumer electronic device, music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, which shows an exemplary hardware architecture of a computing device used in an embodiment of the invention. Computing device 101 comprises an electronic device capable of executing software- or hardware-based instructions according to one or more programs stored in memory. In some embodiments, examples of computing device 101 may include: desktop computers, carputers, game consoles, laptops, notebooks, palmtop, tablet, smartphones, smartbooks, or a server system utilizing CPU 102, local memory 103 and/or remote memory 105, and interface 106. CPU 102 comprises a unit responsible for implementing specific functions associated with the functions of specifically configured computing device or machine. The central processing unit is an acronym which stands for CPU 102. In some embodiments, examples of CPU 102 may include: system-on-a-chip (SOC) type hardware, Qualcomm SNAPDRAGON™, or Samsung EXYNOS™ CPU.

Local memory 103 comprises one or more physical devices used to store programs (sequences of instructions) or data (e g. program state information) on a temporary or permanent basis for use in a computer or other digital electronic device, which may be configured to couple to the system in many different configurations. In some embodiments, examples of local memory 103 may include: non-volatile random-access memory (RAM), read-only memory (ROM), or one or more levels of cached memory. Processor 104 comprises a component that performs the instructions and tasks involved in computer processing. In some embodiments, examples of processor 104 may include: Intel processor, ARM processor, Qualcomm processor, AMD processor, application-specific integrated circuits (ASICs), electrically erasable programmable read-only memories (EEPROMs), field-programmable gate arrays (FPGAs), mobile processor, microprocessor, microcontroller, microcomputer, programmable logic controller, or programmable circuit.

Remote memory 105 comprises a service that provides users with a system for the backup, storage, and recovery of data. Interface 106 comprises a mechanism to control the sending and receiving of data packets over a computer network or support peripherals used with the computing device 101. In some embodiments, examples of interface 106 may include: network interface cards (NICs), ethernet interfaces, frame relay interfaces, cable interfaces, DSL interfaces, token ring interfaces, graphics interfaces, universal serial bus (USB) interfaces, Serial port interfaces, Ethernet interfaces, FIREWIRE™ interfaces, THUNDERBOLT" interfaces, PCI interfaces, parallel interfaces, radio frequency (RF) interfaces, BLUETOOTH™ interfaces, near-field communications interfaces, 802.11 (WiFi) interfaces, frame relay interfaces, TCP/IP interfaces, ISDN interfaces, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, or fiber data distributed interfaces (FDDIs).

Communications network 107 comprises a communications network that allows computers to exchange data using known protocols. In some embodiments, examples of communications network 107 may include: personal area network, wireless personal area network, near-me area network, local area network, wireless local area network, wireless mesh network, wireless metropolitan area network, wireless wide area network, cellular network, home area network, storage area network, campus area network, backbone area network, metropolitan area network, wide area network, enterprise private network, virtual private network, intranet, extranet, Internetwork, Internet, near field communications, mobile telephone network, CDMA network, GSM cellular networks, or WiFi network.

Figure 2:
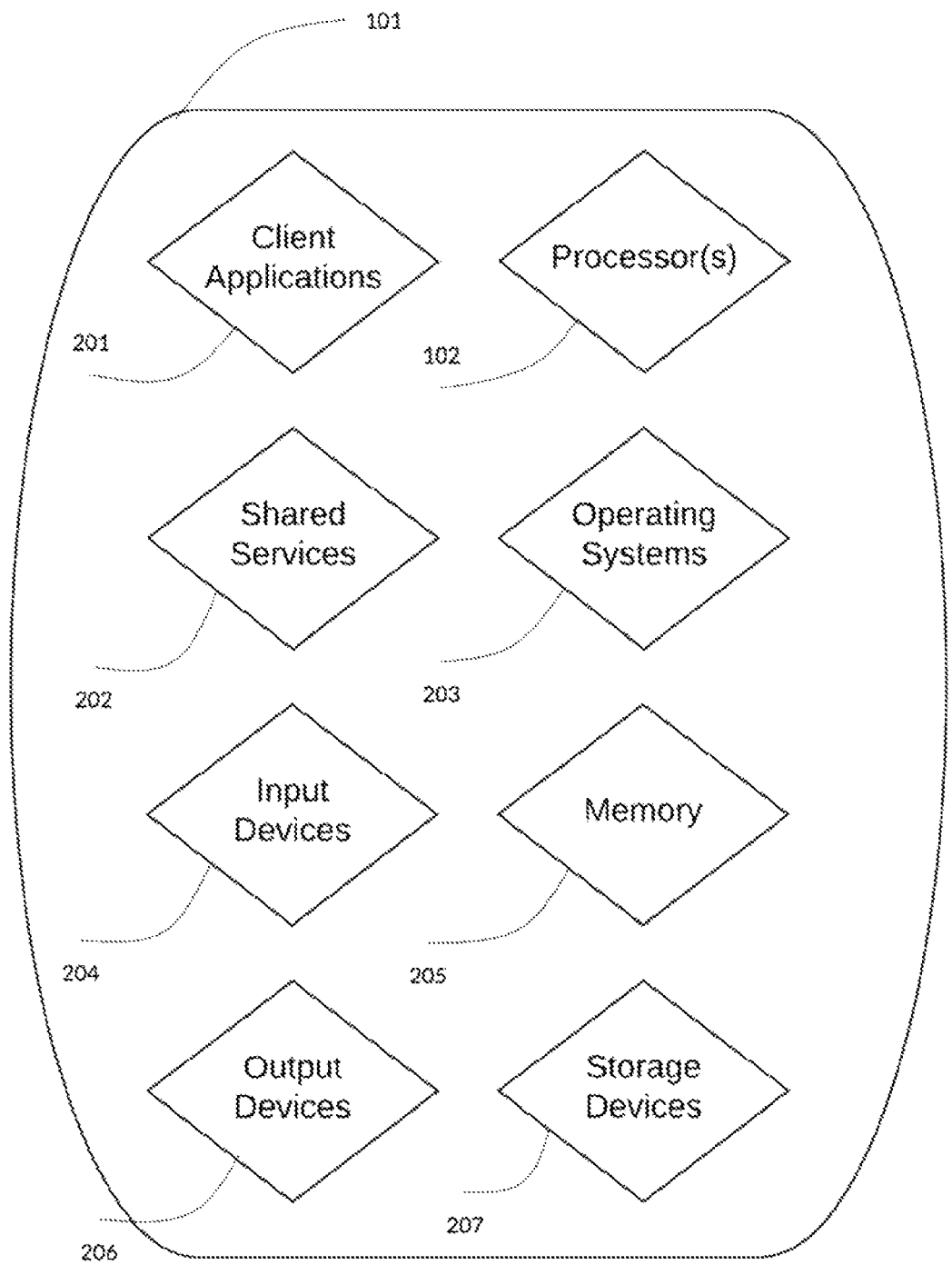
FIG. 2 is a perspective view, which shows an exemplary logical architecture for a client device, according to an embodiment of the invention.

Referring now to FIG. 2, which shows an exemplary logical architecture for a client device, according to an embodiment of the invention. Client application 201 comprises a computing device 101 capable of obtaining information and applications from a server. Shared service 202 comprises web-enabled services or functionality related to a computing device 101. Operating systems 203 comprises system software that manages computer hardware and software resources and provides common services for computer programs. In some embodiments, examples of operating systems 203 may include: Microsoft's WINDOWS™, Apple's Mac OS/X, iOS operating systems, Linux operating system, or Google's ANDROID™ operating system. Input devices 204 comprises device of any type suitable for receiving user input. In some embodiments, examples of input devices 204 may include: keyboard, touchscreen, microphone, mouse, touchpad, or trackball.

Memory 205 comprises mechanism designed to store program instructions, state information, and the like for performing various operations described herein, may be storage devices 207, in some embodiments. In some embodiments, examples of memory 205 may include: read-only memory (ROM), read-only memory (ROM) devices, memristor memory, random access memory (RAM), or RAM hardware modules.

Output devices 206 comprises device of any type suitable for outputting computing device 101 related information. In some embodiments, examples of output devices 206 may include: screens for visual output, speakers, or printers. Storage devices 207 comprises mechanism designed to store information which in some embodiments may be memory 205. In some embodiments, examples of storage devices 207 may include: magnetic media, hard disks, floppy disks, magnetic tape, optical media, CD-ROM disks, magneto-optical media, optical disks, flash memory, solid state drives (SSD), "hybrid SSD" storage drives, swappable flash memory modules, thumb drives, thumb drives, removable optical storage discs, or electrical storage device.

Figure 3:
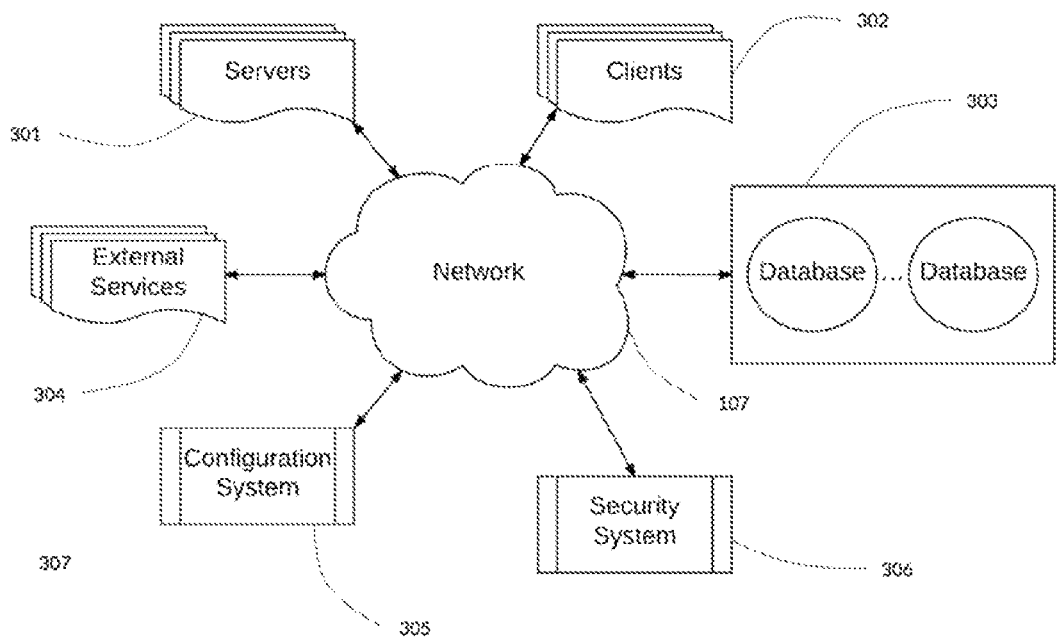
FIG. 3 is a perspective view, which shows an exemplary architectural arrangement of clients, servers, and external services, according to an embodiment of the invention.

Referring now to FIG. 3, which shows an exemplary architectural arrangement of clients, servers, and external services, according to an embodiment of the invention. Server 301 comprises a computing device 101 configured to handle requests received from one or more client 302 over a communications network 107. Client 302 comprises one or more computing device 101 with program instructions for implementing client-side portions of the present system which in some embodiments, may be connected to a communications network 107.

Database 303 comprises programming instructions to provide an organized collection of data designed to allow the definition, creation, querying, update, and administration of databases. In some embodiments, examples of database 303 may include: relational database system, NoSQL system, Hadoop system, Cassandra system, Google BigTable, column-oriented databases, in-memory databases, or clustered databases.

External service 304 comprises web-enabled services or functionality related to or installed on a computing device 101 itself which may be deployed on one or more of a particular enterprise's or user's premises. Configuration system 305 comprises a system common to information technology (IT) and web functions that implements configurations or management system. Security system 306 comprises a system common to information technology (IT) and web functions that implements security related functions for the system. Distributed computing network 307 comprises any number of client 302 and/or server 301 operably connected to a communications network 107 for the purposes of implementing the system.

Figure 4:
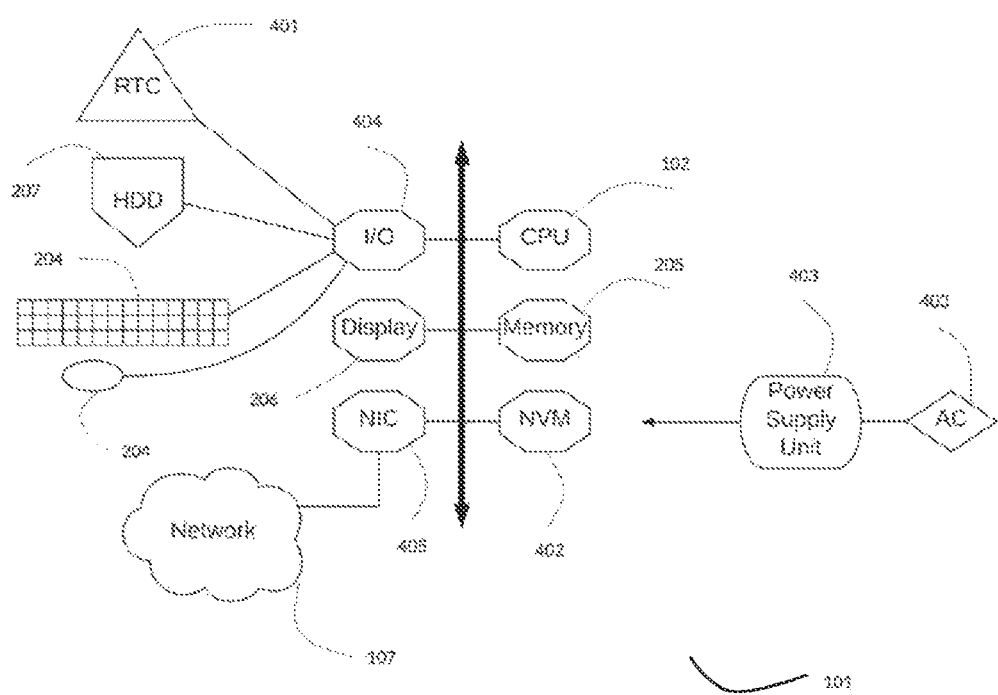
FIG. 4 is a perspective view, which shows an embodiment of a hardware architecture of a computing device connected to a network used in various embodiments of the invention.

Referring now to FIG. 4, which shows an embodiment of a hardware architecture of a computing device connected to a network used in various embodiments of the invention. Real time clock 401 comprises a computing device 101 clock (most often in the form of an integrated circuit) that keeps track of the current time. Nonvolatile memory 402 comprises computer memory that can retrieve stored information even after having been power cycled (turned off and back on). Power supply 403 comprises an electronic device that supplies electric energy to an electrical load. Input output units 404 comprises devices used by a human (or other system) to communicate with a computer. NIC 405 comprises a computer hardware component that connects a computer to a computer network.

Figure 5:
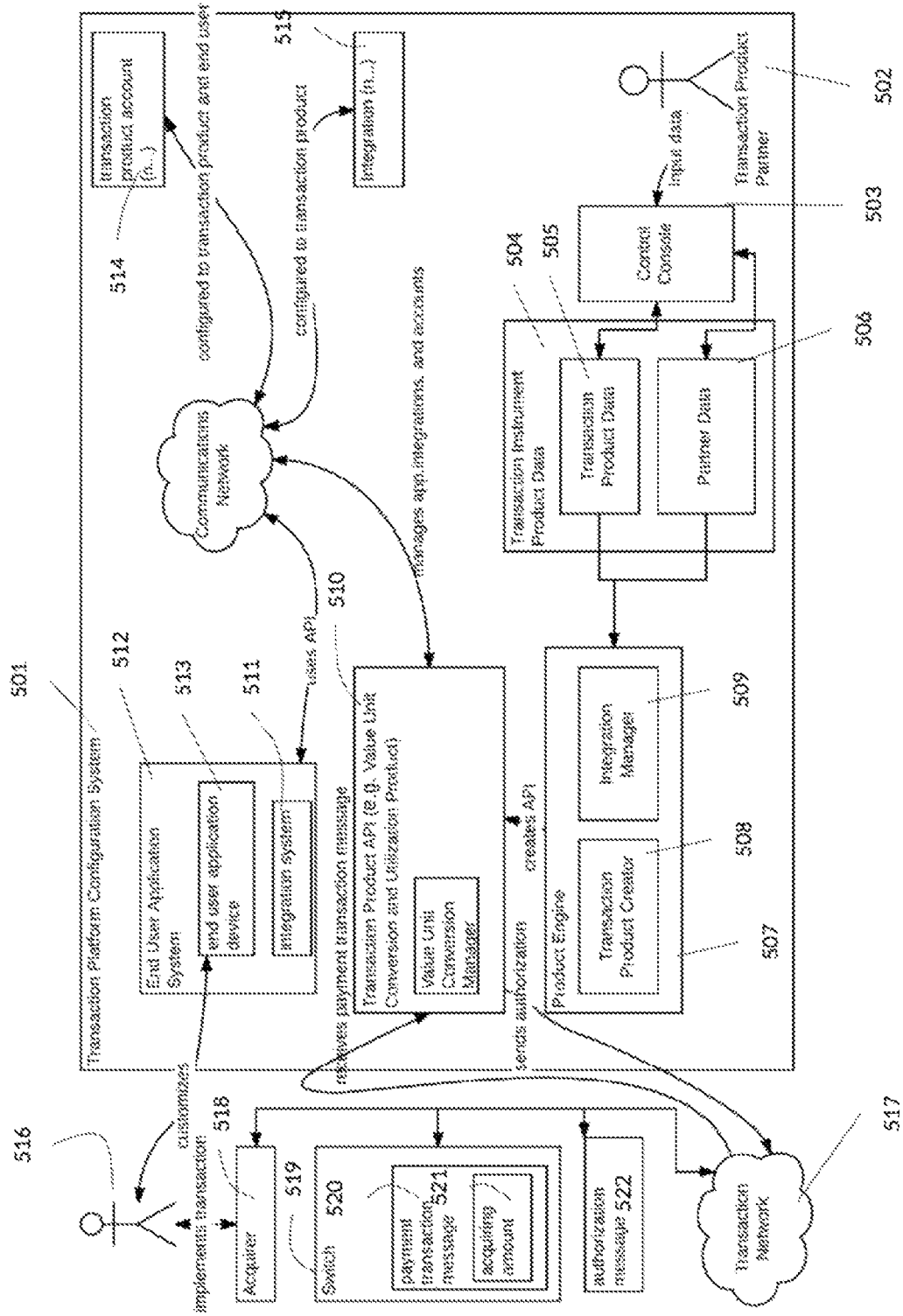
FIG. 5 is a perspective view, which shows a system diagram for creating a transaction product.

Referring now to FIG. 5, which shows a system diagram for creating a transaction product. Transaction platform configuration system 501 comprises a distributed computing network 307 system that may be used to create a transaction product 510. One goal of transaction platform configuration system 501 may be to allow one or more persons to design and build one or more transaction product 510. Transaction platform configuration system 501 preferably comprises control console 503, product engine 507, transaction instrument product data 504, transaction product 510, integration 515, transaction product account 514, and finally, end user application system 512.

To start, a transaction product partner configures the transaction instrument product data 504 within the control console 503. Transaction product partner 502 comprises an entity that specifies the input to the transaction platform configuration system 501 so that transaction product 510 may be created. In some embodiments, examples of transaction product partner 502 may include: a bank, a company, or a payment processor.

Control console 503 comprises an interface on a computing device 101 within a transaction platform configuration system 501 that accepts the transaction product data 505 that may be used by the product engine 507 to create a transaction product 510.

Transaction instrument product data 504 comprises data or data objects that are received by the product engine 507 that allow the creation of one or more transaction product 510. Transaction instrument product data 504 functions to store one or more data parameters or objects for a customized implementation of a transaction product 510. Transaction instrument product data 504 that may be entered into the control console preferably comprises transaction product data 505 and partner data 506.

Transaction product data 505 comprises the overall data or data objects that may be used to create a transaction product 510. One goal of transaction product data 505 may be to allow configuration and creation of multiple types of transaction product 510 dependent on the input data, that can be created by product engine 507.

Transaction product data 505 preferably comprises settlement date data 601, partner fee data 602, program name data 606, card profile data 605, security level data 612, default language data 611, customer interaction data 609, partner risk data 614, end user risk data 607, mail user group data 613, fee list data 603, value unit data 608, mail template data 604, partner location data 610, and finally, memo template data 622.

Partner data 506 comprises data or data objects that configure the transaction product parameters when the transaction product 510 may be being used typically done by a transaction product partner 502. Partner data 506 preferably comprises partner name data 619, partner settlement time data 617, partner main contact data 618, partner language data 620, partner value unit list data 621, and finally, partner administrator data 623.

Once control console receives the transaction instrument product data, a product engine produces the transaction product. Product engine 507 comprises one or more modules on a computing device 101 operably connected to distributed computing network 307 that process transaction product data 505 and create a transaction product 510. One goal of product engine 507 may be to allow the creation of multiple transaction product 510 from different types of transaction product data 505. Product engine 507 comprises integration manager 509 and transaction product creator 508.

In one embodiment, the transaction product may be created by a transaction product creator. Transaction product creator 508 comprises one or more modules that produce the end user application system 512. Transaction product creator 508 has many purposes which are as follows: First, the purpose of transaction product creator 508 may be to allow the creation of end user application system 512 within the transaction product 510. Next, it serves to receives transaction instrument product data 504. Lastly, transaction product creator 508 serves to create a user interface for one or more end-user for operating and/or managing a transaction product 510.

In one embodiment, an integration manager aids the product engine for configuring integrations for the transaction product. Integration manager 509 comprises one or more modules that operably connects to one or more integration 515 for use within the output transaction product 510. One goal of integration manager 509 may be to allow outside data integrations into the transaction product 510 for use, such as a third-party service provider.

In one embodiment, the transaction product may be the resultant sub-system created by the product engine and includes an API for interaction with an end user application system. Transaction product 510 comprises an output of the transaction platform configuration system 501 as a sub-system that includes application programming interface (API) that may be configured to be accessed and managed by one or more transaction product partner 502 and one or more end user 516 for creating applications that allow control over value unit resources on a per transaction basis. In some embodiments, transaction product 510 preferably comprises value unit conversion and utilization product 711.

Integration system 511 comprises one or more modules that allow the configuration of the transaction product 510 to be operably connected to one or more external services such as an integration 515.

End user application system 512 comprises an end user based computing device for interaction with API for integration with preferably an interface that allows use of the transaction product 510. End user application system 512 comprises end user application device 513 and integration system 511.

End user application device 513 comprises one or more computing device 101 that may be used to interact with a transaction product 510 operably connected to a communications network 107. End user application device 513 preferably comprises end user application display 701.

In some embodiments, a transaction product account 514 comprises a holding account for one or more wallet 703 into which value unit can be stored. Integration 515 comprises an external service that connects to the transaction product 510 to perform a transaction. In some embodiments, examples of integration 515 may include: payment gateways and networks, bitcoin exchanges, metal exchanges, value unit exchanges, loyalty point managers, or foreign exchange providers. Transaction network 517 comprises a type of communications network 107 that allows for transactions to be performed.

End user 516 comprises the person who uses the system. Acquirer 518 comprises the entity that processes payments on behalf of a merchant. The acquirer allows merchants to accept payment products from different issuers. Switch 519 comprises the entity that routes transaction messages to the correct networks or entities. Payment transaction message 520 comprises a message including details regarding the transaction and the payment product used to satisfy the transaction, and whether authorization or clearing may be being requested or if the transaction was authorized or declined. Acquiring amount 521 comprises the amount of the charge for a transaction that may be received by an acquirer 518 as part of the payment transaction message 520. Authorization message 522 comprises a message indicating that a transaction was authorized.

Figure 6:
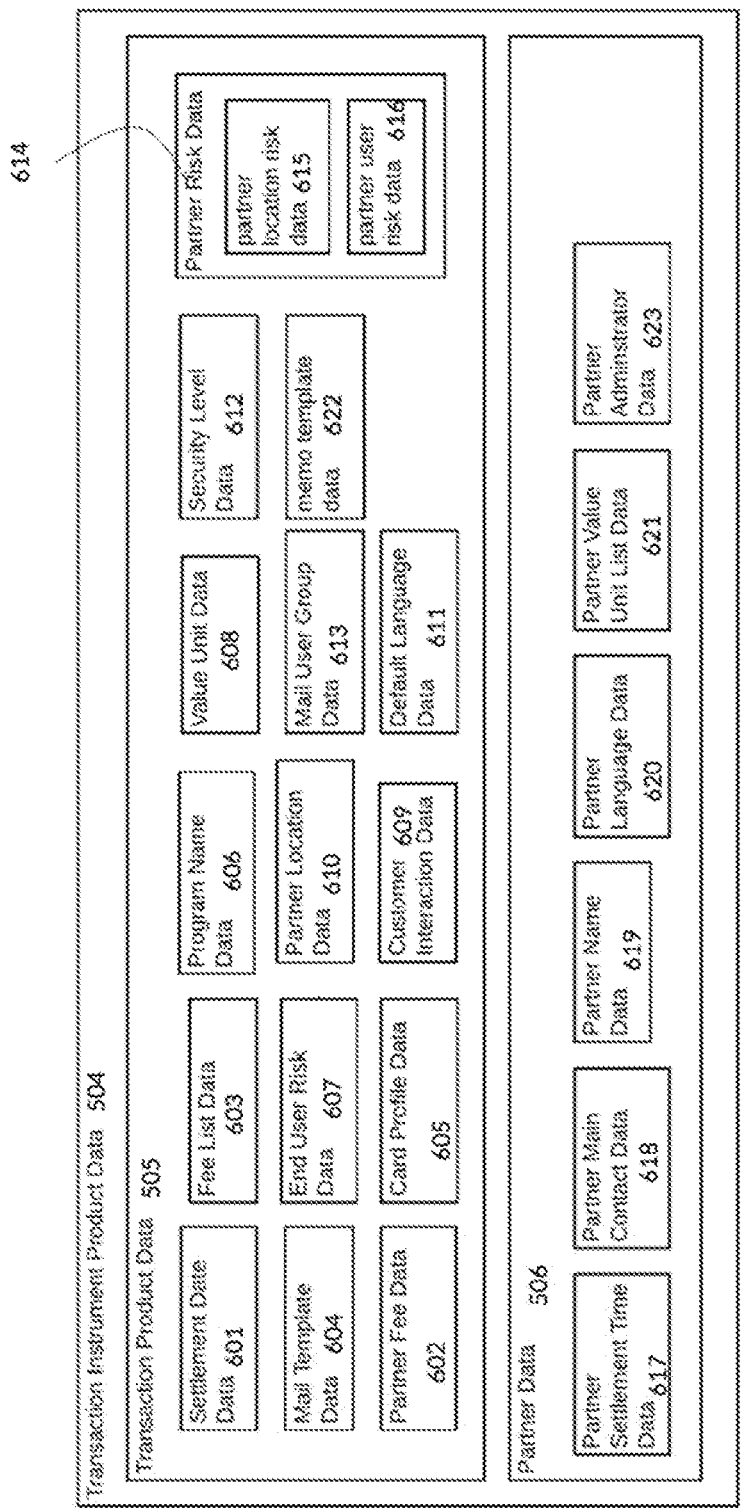
FIG. 6 is a perspective view, which shows the data and organization configured by the control console that allows the creation of a transaction product.

Referring now to FIG. 6, which shows the data and organization configured by the control console that allows the creation of a transaction product. Settlement date data 601 comprises data or data objects that configure the specific transaction product 510 for the settlement date. One goal of settlement date data 601 may be to allow the specific configuration of the time in which the settlements for transactions should occur. Partner fee data 602 comprises data or data objects that characterize a per transaction fee that may be levied by transaction product partner 502. One goal of partner fee data 602 may be to configure the transaction product 510 to designate the transaction product partner 502 fee. Fee list data 603 comprises data or data object that specifies one or more fee levied to an end user 516 of the transaction product 510. One goal of fee list data 603 may be to allow the transaction product partner 502 to ascribe one or more fees to particular end user 516 or transactions.

Mail template data 604 comprises template data, data object or message that may be used to enable a transaction product partner 502 to notify an end user 516 of an event. Mail template data 604 allows communication from transaction product partner 502 to end user 516 to be styled and customized. Card profile data 605 comprises data or data objects that configure the specific transaction product 510 for the design of any physical cards issued as part of the transaction product 510 and establishes the first 6 digits of any physical or virtual card. Program name data 606 comprises data or data objects that configures the specific name of the transaction product 510 that may be being used.

End user risk data 607 comprises data or parameters that are set that configure the transaction product 510 to limit a customer's spending or withdrawal on specified metrics. In some embodiments, examples of end user risk data 607 may include: limiting the one time, one day or seven day customer P2P amount, limiting the one time, one day or seven day ATM withdrawal amount, limiting one time, one day or seven day purchase amount, limiting the one time, one day or seven day adjustment amount, limiting the one time, one day or seven day refund count, limiting the one time, one day or seven day refund amount, limiting the number of pin failures, listing blocked countries, listing blocked merchant categories, or defining transaction speed (for example, in mph, calculated based on time lapsed and distance traveled between two in-person transactions using the same transaction product 510 by the end user 516, where if exceeded, a flag might be set as too fast). One goal of end user risk data 607 may be to allow the specific metrics to be set for risk associated with an end user's transactions.

Value unit data 608 comprises data or data objects that configure the specific types of value unit when the transaction product 510 may be used. One goal of value unit data 608 may be to have a list of value units that a transaction product 510 can operate on. Customer interaction data 609 comprises data or data objects that configure the specific interactions that customers can have with the transaction product 510. Partner location data 610 comprises data or data objects that contain a location where the transaction product partner 502 can distribute, sell or service a transaction product 510. One goal of partner location data 610 may be to allow the configuration of the transaction product 510 to be configured to a location of the transaction product partner 502.

Default language data 611 comprises data or data objects that configure the default language to be used in the transaction product 510. One goal of default language data 611 may be to allow the transaction product 510 to be configured into different languages for potential use in countries of varying language. Security level data 612 comprises data or data objects that may be a grouping of one or more end user risk data 607 parameters that can be designated as nominal security level. For example, 3 risk parameters can be grouped into security level 1. Then, an additional 5 risk parameters can be designated as level 2. Security level data 612 functions to both 1) allow the transaction product 510 to have varying groups of end user risk data 607 designated as security levels and to 2) allow customer to be assigned to different security levels.

Mail user group data 613 comprises data or data objects that are customers or users of the transaction product 510 for communication such as marketing, safety, security, etc. One goal of mail user group data 613 may be to allow emails to be sent to an end-user of the transaction product 510 with specific templating or styles. Partner risk data 614 comprises data or data object used to control the transactional volume of one or more transaction product partner locations used by the transaction product partner 502 to service one or more of the transaction product 510. One goal of partner risk data 614 may be to allow the configuration for setting parameters. Partner risk data 614 comprises partner location risk data 615 and partner user risk data 616. In some embodiments, an example of partner location risk data 615 could be limiting the one time, one day or seven day customer load amount per location or perhaps limiting the one time, one day or seven day customer withdrawal amount per location and the like.

Partner user risk data 616 comprises data or data objects that are used to control the transactional volume of partner users at transaction product partner locations used by the transaction product partner 502 to service one or more of the transaction product 510. In some embodiments, an example of partner user risk data 616 could be limiting the one time, one day or seven day customer withdrawal amount per partner user or perhaps limiting the one time, one day or seven day customer load amount per partner user and the like. Partner settlement time data 617 comprises data or data objects that configure the transaction partner settlement time when the transaction product 510 may be used. One goal of partner settlement time data 617 may be to allow the specific configuration of the settlement time (of day) when aggregating transactions and in which the settlements for transactions should occur.

Partner main contact data 618 comprises data or data objects that configure the transaction product partner 502 main person's contact information. Partner name data 619 comprises data or data objects that configure the partner data 506 name information for the transaction product 510. Partner language data 620 comprises data or data objects that configure the partner data 506 for the languages to display when using the transaction product 510. Partner value unit list data 621 comprises data, array, data objects or data object arrays that configure the transaction product partner 502 value units that they can support that are to be part of the transaction product 510. Memo template data 622 comprises template data, data object or message that may be used to provide an end user 516 with specific information regarding each transaction. One goal of memo template data 622 may be to allow transaction detail communication to end user 516 to be styled and customized. Partner administrator data 623 comprises data or data objects that allow the establishment of profiles and roles for people to administer the transaction product 510. In some embodiments, examples of partner administrator data 623 may include: risk parameters, security levels, role configurations, or permissions configurations. One goal of partner administrator data 623 may be to allow the configuration of users of the transaction product 510.

Figure 7:
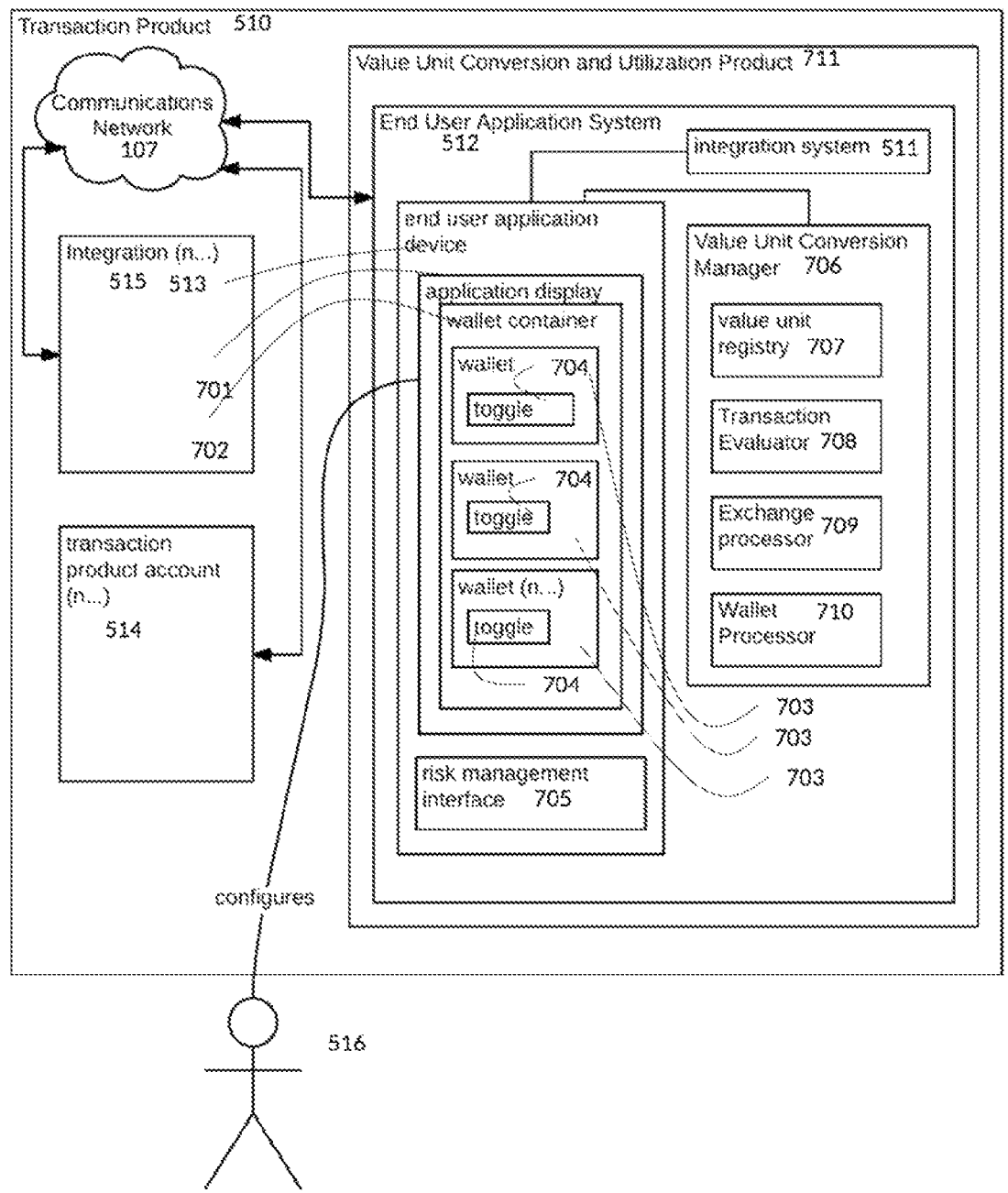
FIG. 7 is a perspective view, which shows the creation and organization of wallets for processing from an acquirer on a per transaction basis.

Referring now to FIG. 7, which shows the creation and organization of wallets for processing from an acquirer on a per transaction basis. End user application display 701 comprises a display for interaction with value unit conversion and utilization product 711 platform. End user application display 701 comprises wallet container 702 and risk management interface 705. Wallet container 702 comprises the display where the wallet 703 order can be adjusted to determine the primary wallet sequence data 804. Wallet container 702 preferably comprises one or more wallet 703.

Wallet 703 comprises a graphical module that may have an interface, data, data object or processor functions that hold an amount of value unit. Wallet 703 has an alternative embodiment herein termed a "cross boundary wallet". The cross-boundary wallet comprises a wallet that does not interact with a transaction product account but rather interacts with a cross boundary account through an external call.

Wallet 703 preferably comprises secondary wallet sequence selector toggle 704. The secondary wallet sequence selector toggle 704 comprises an end-user interface selector that allows an end user to toggle the status of a wallet 703 between being part of the secondary wallet sequence or not.

Risk management interface 705 comprises a means for transaction product partner 502 or end user 516 to manage their own risk based on end user risk data 607. Value unit conversion manager 706 comprises a module that implements algorithms and/or stores data for value unit conversion. In one embodiment, value unit conversion manager 706 preferably comprises wallet processor 710, transaction evaluator 708, exchange processor 709, and finally, value unit registry 707. Value unit registry 707 comprises parameters that configure value unit exchange.

Transaction evaluator 708 comprises one or more modules that manages the data, algorithms and functions of the transaction product 510 on a per transaction basis. In one embodiment, transaction evaluator 708 preferably comprises acquiring amount data, transaction determiner, applicable fees data, fee selector, transaction calculator, and finally, total required amount.

Exchange processor 709 comprises one or more modules that implements algorithms and/or stores data to mediate exchanges of value unit between one or more wallet container 702. Exchange processor 709 preferably comprises wallet to target value unit rate, wallet value unit, target value unit wallet 803, target value unit, and finally, required amount running total.

Wallet processor 710 comprises one or more modules that implement algorithms/store data to support wallet-based functions of the transaction product 510. Wallet processor 710 preferably comprises secondary wallet sequence selector, primary wallet sequence data 804, secondary wallet sequence data 802, wallet type data, wallet process algorithm, and finally, hold clearer.

Value unit conversion and utilization product 711 comprises an embodiment of transaction product 510 that allows an end user 516 to manage multiple value unit types and conduct one or more transaction. One goal of value unit conversion and utilization product 711 may be to allow a person to have one or more wallet 703 of different value units operably connected to one or more exchanges for denoting the manner within which value unit can be exchanged, withdrawn, used for purchases or otherwise utilized. Value unit conversion and utilization product 711 preferably comprises value unit conversion manager 706.

Figure 8:
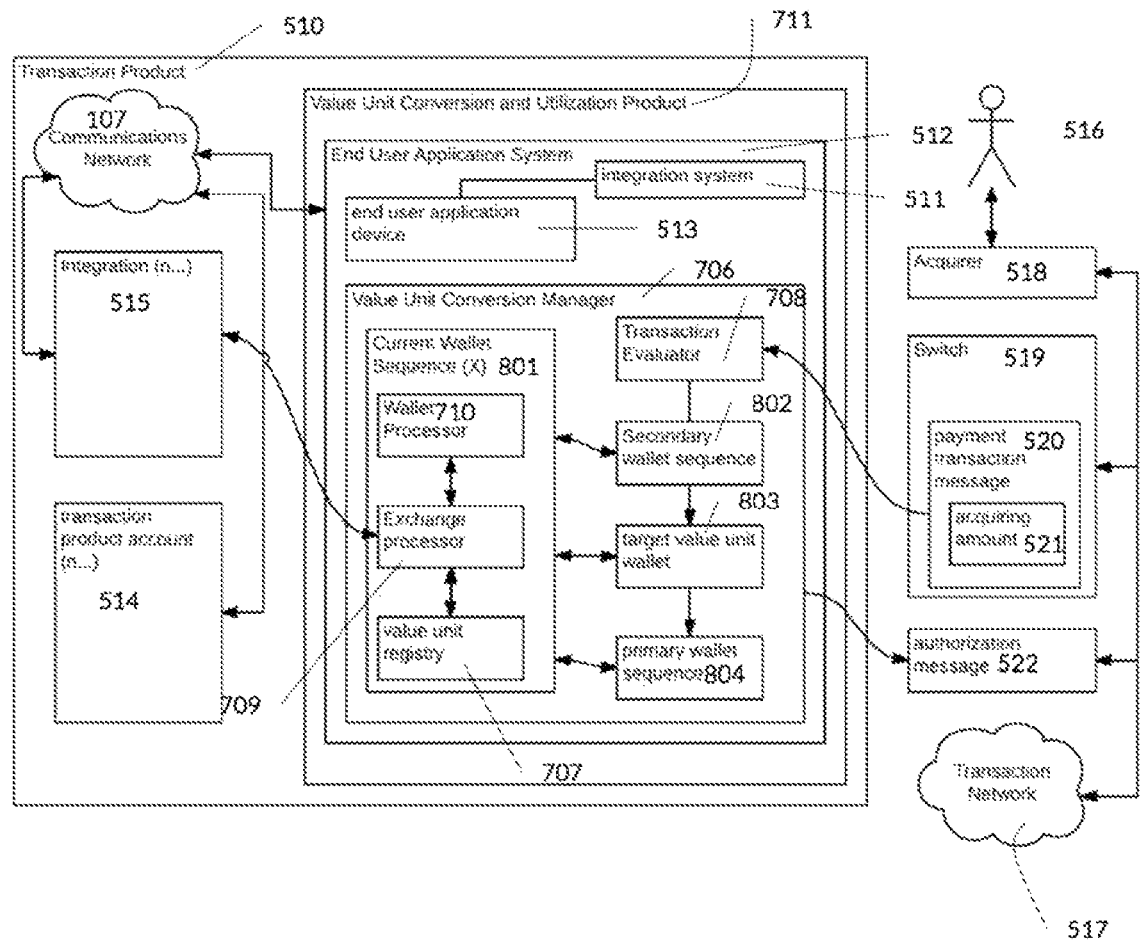
FIG. 8 is a perspective view, which shows implementation of the transaction product during a transaction.

Referring now to FIG. 8, which shows implementation of the transaction product during a transaction. Current wallet sequence 801 comprises the instance data sequence that may be being iterated over. For example, the primary wallet sequence data 804 or secondary wallet sequence data 802. Secondary wallet sequence data 802 comprises a sequence of one or more wallet 703 that may be selected from the primary wallet sequence data 804 and inherits the order of the primary wallet sequence data 804.

Target value unit wallet 803 comprises a currency type that may be required from the payment transaction message 520 to fulfill. Primary wallet sequence data 804 comprises a sequence of one or more wallet 703 set in a particular order. One goal of primary wallet sequence data 804 may be to allow end user 516 of the transaction product 510 to set the order in which wallet value unit should be applied to transactions.

Figure 9A:
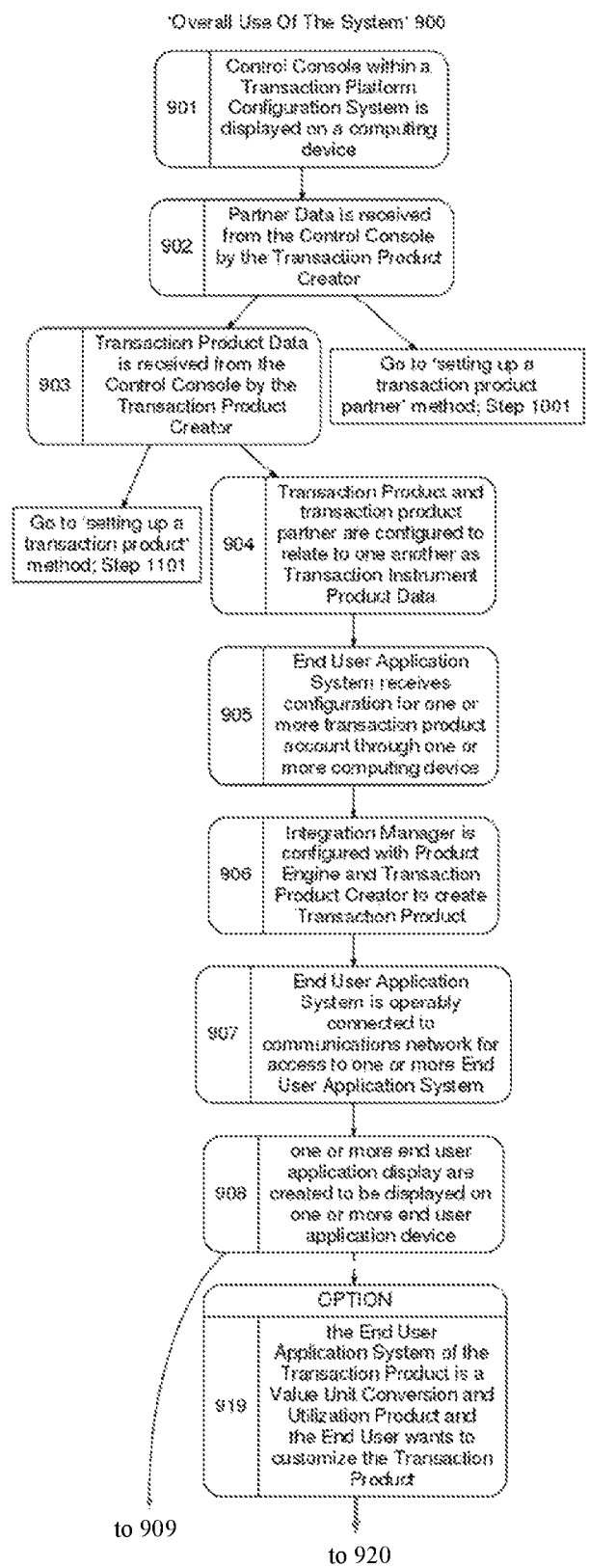
FIG. 9A-9B are diagrams of an overall use of the system.
Figure 9B:
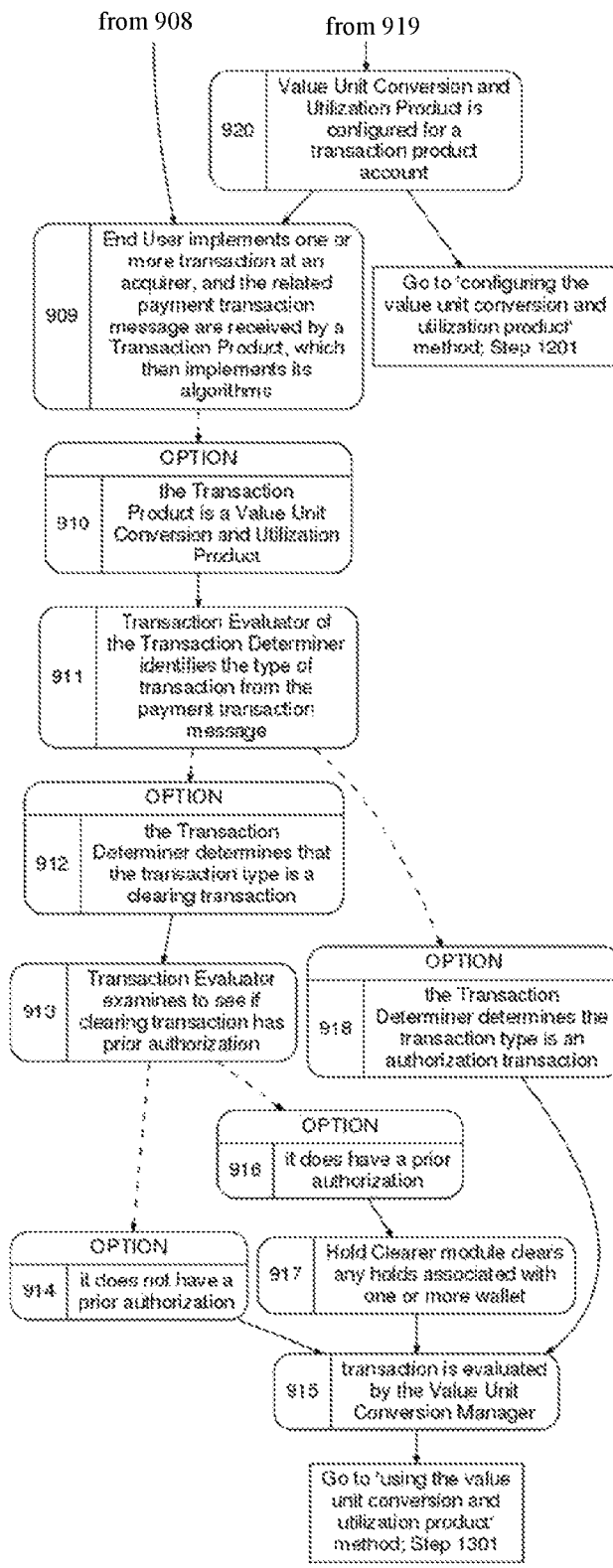

Referring now to FIG. 9, which shows overall use of the system. In a first step, control console 503 within a transaction platform configuration system 501 may be displayed on a computing device 101 (Step 901). Next, partner data 506 may be received from the control console 503 by the transaction product creator 508 (Step 902). Step 902 is further detailed below in a related method (1000—'setting up a transaction product partner').

Next, transaction product data 505 may be received from the control console 503 by the transaction product creator 508 (Step 903). Step 903 is further detailed below in a related method (1100—'setting up a transaction product'). Next, transaction product 510 and transaction product partner 502 are configured to relate to one another as transaction instrument product data 504 (Step 904). Next, end user application system 512 receives configuration for one or more transaction product account 514 through one or more computing device 101 (Step 905). Next, integration manager 509 may be configured with product engine 507 and transaction product creator 508 to create transaction product 510 (Step 906).

Next, end user application system 512 may be operably connected to communications network 107 for access to one or more end user application system 512 (Step 907). Next, one or more end user application display 701 are created to be displayed on one or more end user application device 513 (Step 908).

Next, end user 516 implements one or more transaction at an acquirer 518, and the related payment transaction message 520 are received by a transaction product 510, which then implements its algorithms (Step 909). If the transaction product 510 may be a value unit conversion and utilization product 711 (Step 910), then transaction evaluator 708 of the transaction determiner identifies the type of transaction from the payment transaction message 520 (Step 911).

If the transaction determiner determines that the transaction type may be a clearing transaction (Step 912), then transaction evaluator 708 examines to see if clearing transaction has prior authorization (Step 913).

If it does not have a prior authorization (Step 914), then transaction may be evaluated by the value unit conversion manager 706 (Step 915). Step 915 is further detailed below in a related method (1300—'using the value unit conversion and utilization product').

From Step 913, if it does have a prior authorization (Step 916), then hold clearer module clears any holds associated with one or more wallet 703 (Step 917). Next, refer to Step 915.

From Step 911, if the transaction determiner determines the transaction type may be an authorization transaction (Step 918), then refer to Step 915.

From Step 908, if the end user application system 512 of the transaction product 510 may be a value unit conversion and utilization product 711 and the end user 516 wants to customize the transaction product 510 (Step 919), then value unit conversion and utilization product 711 may be configured for a transaction product account 514 (Step 920). Step 920 is further detailed below in a related method (1200—'configuring the value unit conversion and utilization product'). Next, refer to Step 909.

Figure 10:
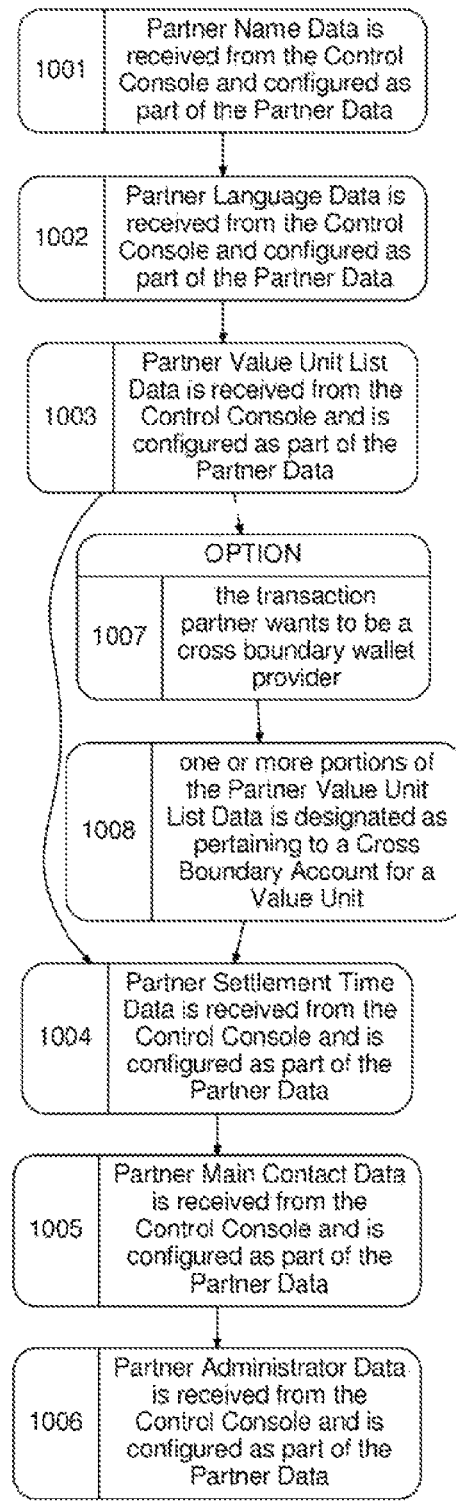
FIG. 10 is a diagram of setting up a transaction product partner.

Referring now to FIG. 10, which shows setting up a transaction product partner. In a first step, partner name data 619 may be received from the control console 503 and configured as part of the partner data 506 (Step 1001). Next, partner language data 620 may be received from the control console 503 and configured as part of the partner data 506 (Step 1002). Next, partner value unit list data 621 may be received from the control console 503 and may be configured as part of the partner data 506 (Step 1003).)

Next, partner settlement time data 617 may be received from the control console 503 and may be configured as part of the partner data 506 (Step 1004). Next, partner main contact data 618 may be received from the control console 503 and may be configured as part of the partner data 506 (Step 1005). Next, partner administrator data 623 may be received from the control console 503 and may be configured as part of the partner data 506 (Step 1006).

From Step 1003, if the transaction partner wants to be a cross boundary wallet provider (Step 1007), then one or more portions of the partner value unit list data 621 may be designated as pertaining to a cross boundary account for a value unit (Step 1008). Next, refer to Step 1004.

Figure 11A:
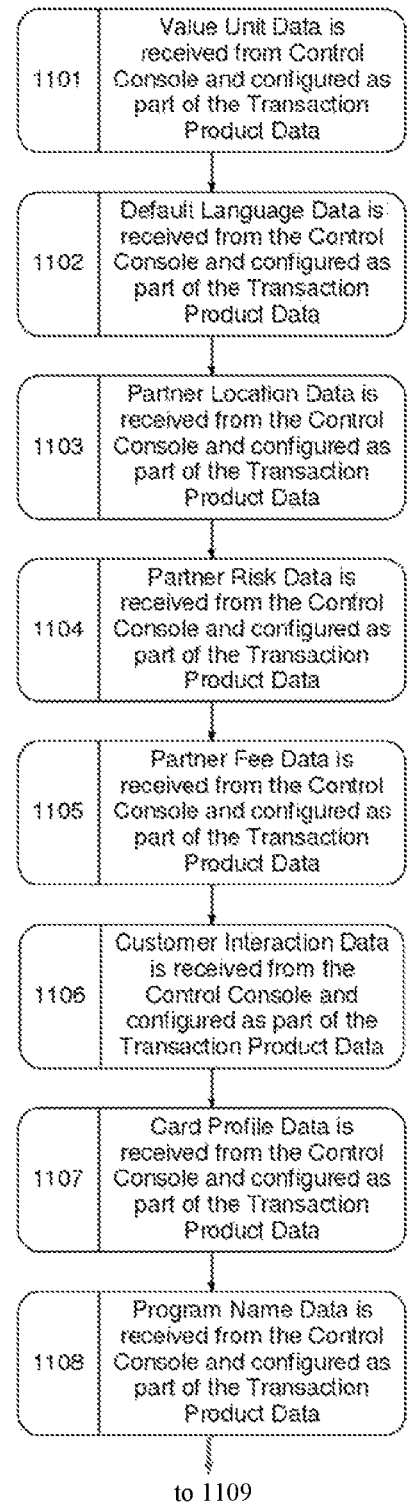
FIG. 11A-11B are diagrams of setting up a transaction product.
Figure 11B:
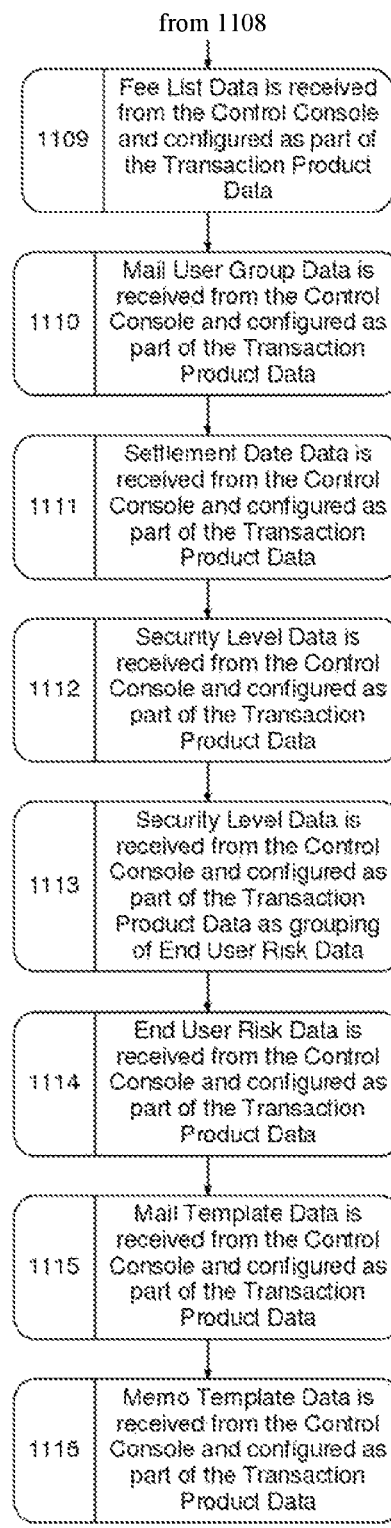

Referring now to FIG. 11, which shows setting up a transaction product. In a first step, value unit data 608 may be received from control console 503 and configured as part of the transaction product data 505 (Step 1101). Next, default language data 611 may be received from the control console 503 and configured as part of the transaction product data 505 (Step 1102). Next, partner location data 610 may be received from the control console 503 and configured as part of the transaction product data 505 (Step 1103). Next, partner risk data 614 may be received from the control console 503 and configured as part of the transaction product data 505 (Step 1104).

Next, partner fee data 602 may be received from the control console 503 and configured as part of the transaction product data 505 (Step 1105). Next, customer interaction data 609 may be received from the control console 503 and configured as part of the transaction product data 505 (Step 1106). Next, card profile data 605 may be received from the control console 503 and configured as part of the transaction product data 505 (Step 1107). Next, program name data 606 may be received from the control console 503 and configured as part of the transaction product data 505 (Step 1108).

Next, fee list data 603 may be received from the control console 503 and configured as part of the transaction product data 505 (Step 1109). Next, mail user group data 613 may be received from the control console 503 and configured as part of the transaction product data 505 (Step 1110). Next, settlement date data 601 may be received from the control console 503 and configured as part of the transaction product data 505 (Step 1111). Next, security level data 612 may be received from the control console 503 and configured as part of the transaction product data 505 (Step 1112).

Next, security level data 612 may be received from the control console 503 and configured as part of the transaction product data 505 as grouping of end user risk data 607 (Step 1113). Next, end user risk data 607 may be received from the control console 503 and configured as part of the transaction product data 505 (Step 1114). Next, mail template data 604 may be received from the control console 503 and configured as part of the transaction product data 505 (Step 1115). Next, memo template data 622 may be received from the control console 503 and configured as part of the transaction product data 505 (Step 1116).

Figure 12:
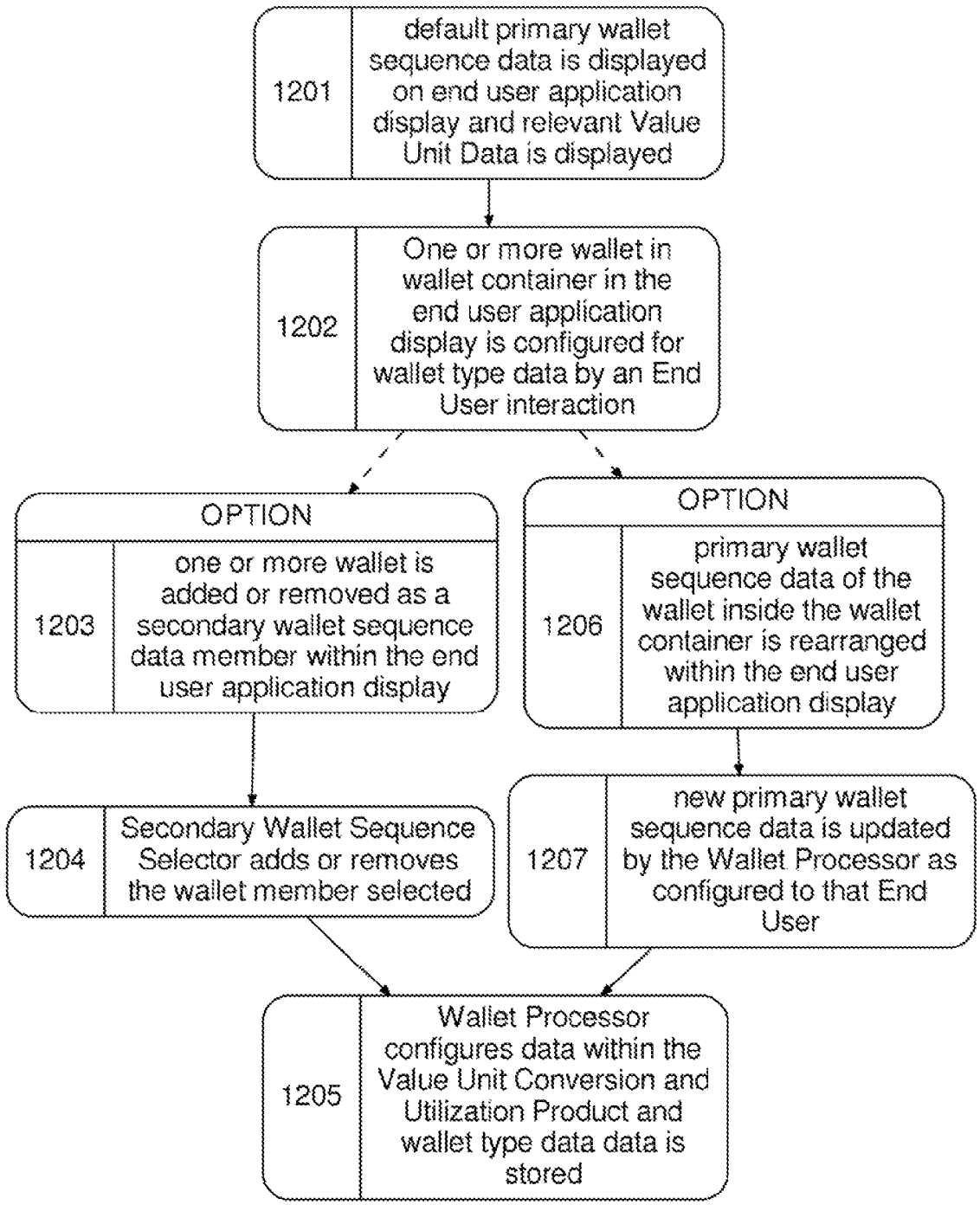
FIG. 12 is a diagram of configuring the value unit conversion and utilization product.

Referring now to FIG. 12, which shows configuring the value unit conversion and utilization product. In a first step, default primary wallet sequence data 804 may be displayed on end user application display 701 and relevant value unit data 608 may be displayed (Step 1201). Next, one or more wallet 703 in wallet container 702 in the end user application display 701 may be configured for wallet type data by an end user 516 interaction (Step 1202).

If one or more wallet 703 may be added or removed as a secondary wallet sequence data 802 member within the end user application display 701 (Step 1203), then secondary wallet sequence selector adds or removes the wallet member selected (Step 1204). Next, wallet processor 710 configures data within the value unit conversion and utilization product 711 and wallet type data may be stored (Step 1205).

From Step 1202, if primary wallet sequence data 804 of the wallet 703 inside the wallet container 702 may be rearranged within the end user application display 701 (Step 1206), then new primary wallet sequence data 804 may be updated by the wallet processor 710 as configured to that end user 516 (Step 1207). Next, refer to Step 1205.

Figure 13:
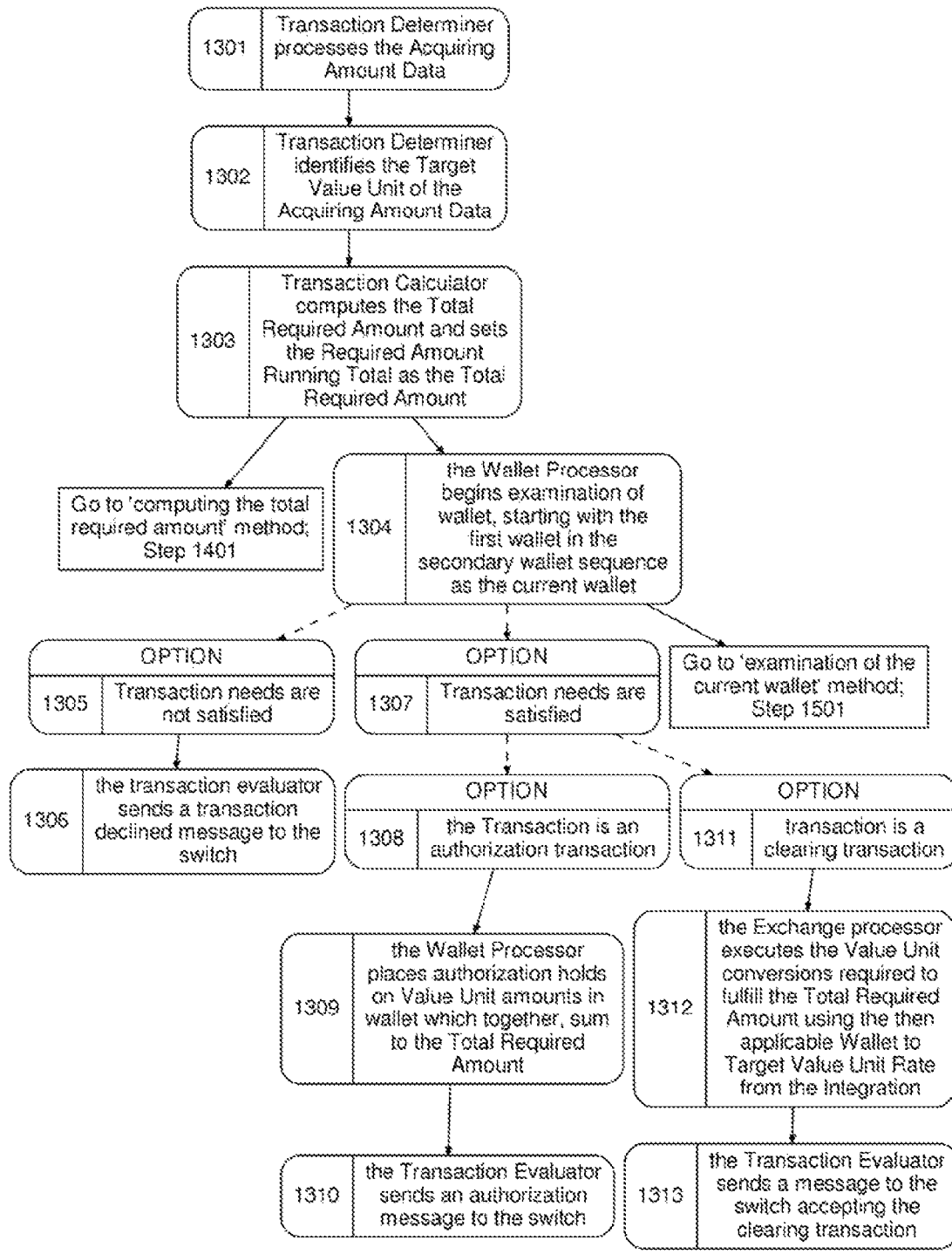
FIG. 13 is a diagram of using the value unit conversion and utilization product.

Referring now to FIG. 13, which shows using the value unit conversion and utilization product. In a first step, transaction determiner processes the acquiring amount data (Step 1301). Next, transaction determiner identifies the target value unit of the acquiring amount data (Step 1302). Next, transaction calculator computes the total required amount and sets the required amount running total as the total required amount (Step 1303). Step 1303 is further detailed below in a related method (1400 —'computing the total required amount'). Next, the wallet processor 710 begins examination of wallet 703, starting with the first wallet 703 in the secondary wallet sequence as the current wallet 703 (Step 1304). Step 1304 is further detailed below in a related method (1500—'examination of the current wallet').

If transaction needs are not satisfied (Step 1305), then the transaction evaluator sends a transaction declined message to the switch 519 (Step 1306).

From Step 1304, if transaction needs are satisfied (Step 1307), and if the transaction may be an authorization transaction (Step 1308), then the wallet processor 710 places authorization holds on value unit amounts in wallet 703 which together, sum to the total required amount (Step 1309). Next, the transaction evaluator 708 sends an authorization message 522 to the switch 519 (Step 1310).

From Step 1307, if transaction may be a clearing transaction (Step 1311), then the exchange processor 709 executes the value unit conversions required to fulfill the total required amount using the then applicable wallet to target value unit rate from the integration 515 (Step 1312). Next, the transaction evaluator 708 sends a message to the switch 519 accepting the clearing transaction (Step 1313).

Figure 14:
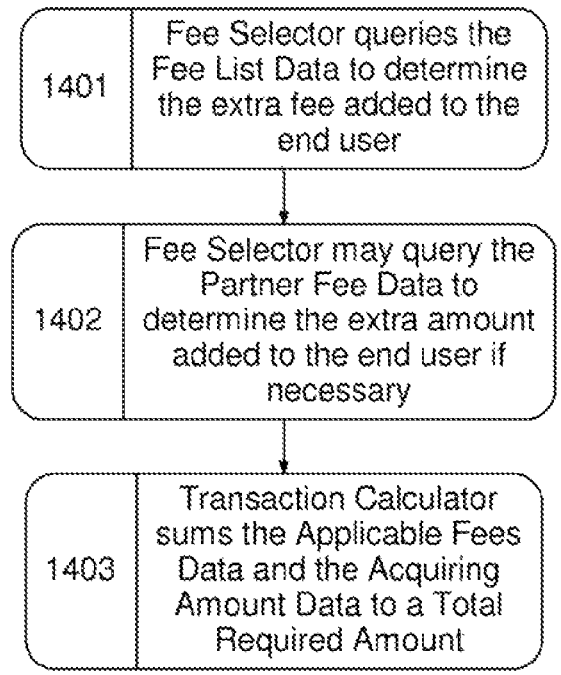
FIG. 14 is a diagram of computing the total required amount.

Referring now to FIG. 14, which shows computing the total required amount. In a first step, fee selector queries the fee list data 603 to determine the extra fee added to the end user (Step 1401). Next, fee selector may query the partner fee data 602 to determine the extra amount added to the end user if necessary (Step 1402). Next, transaction calculator sums the applicable fees data and the acquiring amount data to a total required amount (Step 1403).

Figure 15A:
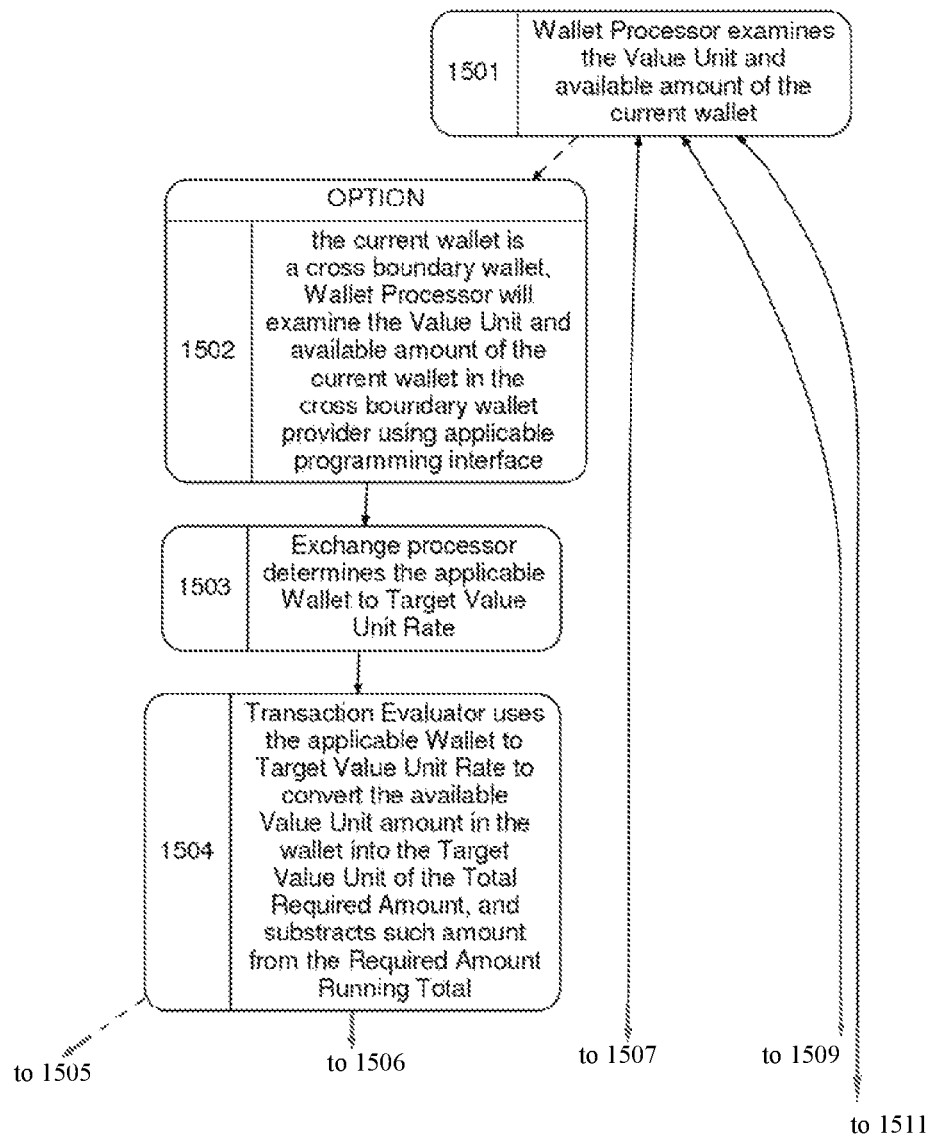
FIG. 15A-15B are diagrams of an examination of the current wallet.
Figure 15B:
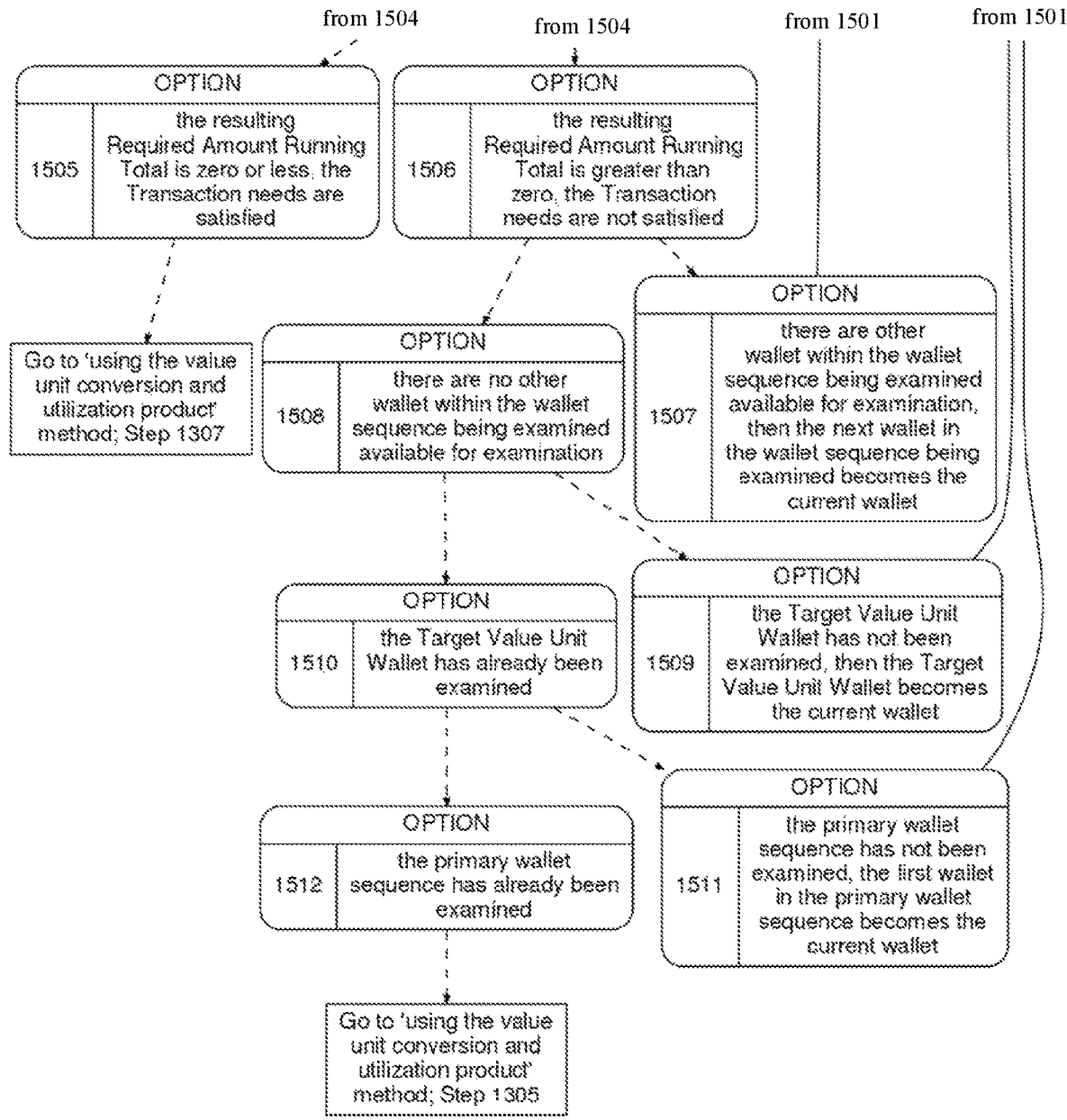

Referring now to FIG. 15, which shows examination of the current wallet. In a first step, wallet processor 710 examines the value unit and available amount of the current wallet 703 (Step 1501). If the current wallet 703 may be a cross boundary wallet, wallet processor 710 will examine the value unit and available amount of the current wallet 703 in the cross boundary wallet provider using applicable programming interface (Step 1502), then exchange processor 709 determines the applicable wallet to target value unit rate (Step 1503).

Next, transaction evaluator 708 uses the applicable wallet to target value unit rate to convert the available value unit amount in the wallet 703 into the target value unit of the total required amount, and subtracts such amount from the required amount running total (Step 1504).

If the resulting required amount running total may be zero or less, the transaction needs are satisfied (Step 1505). Then refer to Step 1307.

From Step 1504, and if the resulting required amount running total may be greater than zero, the transaction needs are not satisfied (Step 1506). If there are other wallet 703 within the wallet sequence being examined available for examination, then the next wallet 703 in the wallet sequence being examined becomes the current wallet 703 (Step 1507). Then refer to Step 1501.

From Step 1506, if there are no other wallet 703 within the wallet sequence being examined available for examination (Step 1508), and if the target value unit wallet 803 has not been examined, then the target value unit wallet 803 becomes the current wallet 703 (Step 1509). Then refer to Step 1501.

From Step 1508, if the target value unit wallet 803 has already been examined (Step 1510), and if the primary wallet sequence has not been examined, the first wallet 703 in the primary wallet sequence becomes the current wallet 703 (Step 1511). Then refer to Step 1501. From Step 1510, if the primary wallet sequence has already been examined (Step 1512), then refer to Step 1305.

The following elements and/or terms: wallet process algorithm, total required amount, wallet to target value unit rate, wallet type data, cross boundary wallet provider, transaction determiner, acquiring amount data, applicable fees data, transaction calculator, authorization transaction, clearing transaction, fee selector, secondary wallet sequence selector, required amount running total, target value unit, exchange table, exchange table updater, value unit, transaction, cross boundary account, physical ports, independent processor, interface memory, busses, program instructions, system server, mouse, keyboard, graphical user interface, cross boundary wallet, hold clearer, data object, and wallet value unit, are important for the working functionality, but do not appear in the drawings and are shown below.

Wallet process algorithm comprises logics that determine and calculate if sufficient value units are available to satisfy a transaction, including ability to determine the order in which value units in wallet 703 within a value unit conversion and utilization product 711 should be applied, calculating and storing data regarding the required amount running total, placing authorization holds on value unit amounts.

Total required amount comprises data or data object that stores the sum of the applicable fees data and the acquiring amount data.

Wallet to target value unit rate comprises a value unit conversion rate derived from the wallet value unit and the target value unit.

Wallet type data indicates if a wallet 703 may be part of the secondary wallet sequence.

Cross boundary wallet provider comprises an entity that holds an account for a wallet 703 that has URL, username, password, exposes that allows account management including authorization holds, withdrawals, transfers, and the like.

Transaction determiner comprises module that gets one or more data from the payment transaction message 520 for use within the transaction evaluator 708. One goal of transaction determiner may be to allow processing of the payment transaction message 520 to gather relevant data to implement use of the value unit conversion and utilization product 711.

Acquiring amount data comprises the value unit amount gathered from the payment transaction message 520.

Applicable fees data comprises a module that holds the sum of the fees gathered from the fee selector.

Transaction calculator comprises a module that sums the applicable fees data and the acquiring amount data to get the total required amount.

Authorization transaction comprises a transaction transmitted from the acquirer 518 through the transaction network 517, requesting approval to authorize a transaction initiated by an end user 516.

Clearing transaction comprises a transaction in which actual settlement of payment may be required.

Fee selector comprises a module that determines the additional fees to be added to the amount gathered from the payment transaction message 520. One goal of fee selector may be to have a means to query configured data to determine the fees to be added when determining the total required amount.

Secondary wallet sequence selector comprises a module that adds or removes a wallet 703 from the secondary wallet sequence data 802.

Required amount running total comprises a running tally amount in the target value unit used by the transaction evaluator 708 during the examination of the current wallet to determine if the transaction needs can be satisfied.

Target value unit comprises a value unit type that may be required from the payment transaction message 520 to fulfill.

Exchange table comprises data on different value unit and their exchange rates.

Exchange table updater comprises a means to update the data in an exchange table.

Value unit comprises a unit of tradable value that can be calculated to have at least one exchange rate.

Transaction comprises an event that effects a change in one or more value unit. In some embodiments, an example of transaction may include conversion, trade, transfer, payment, withdrawal and the like.

Cross boundary account comprises the associated account for cross boundary wallet provider.

Physical ports comprise a specialized outlet on a piece of equipment to which a plug or cable connects.

Independent processor comprises a processor 104 that allows communication with appropriate media. In some embodiments, an example of independent processor could be audio processor or perhaps video processor and the like.

In some embodiments, examples of interface memory may include: volatile and/or non-volatile memory (e.g., RAM), DDR, DDR2, or GDDR.

Busses comprises a communication system that transfers data between components inside a computer, or between computers.

Program instructions comprises a mechanism for control execution of, or comprise of an operating system, and/or one or more applications. In some embodiments, examples of program instructions may include: object code, code produced by a compiler, machine code, code produced by an assembler or a linker, byte code, or code executed using an interpreter.

System server comprises a computing device 101.

Mouse comprises a pointing device that detects two-dimensional motion relative to a surface.

Keyboard comprises a text entry interface to type text and numbers into a word processor, text editor or other programs.

Graphical user interface comprises a type of user interface that allows users to interact with electronic devices through graphical icons and visual indicators such as secondary notation, instead of text-based user interfaces, typed command labels or text navigation.

Cross boundary wallet comprises a wallet that does not interact with a transaction product account but rather interacts with a cross boundary account through an external call.

Hold clearer comprises one or more modules that clears a hold off of an authorization transaction. One goal of hold clearer may be to allow one to clear the account of demarcated value units that were designated during an authorization transaction.

Data object comprises a variable, a data structure, a function, or a method, and as such, may be a location in memory having a value and possibly referenced by an identifier. In some embodiments, an example of data object could be a particular instance of a class where the object can be a combination of variables, functions, and data structures or perhaps a table or column, or an association between data and a database entity (such as relating a person's age to a specific person) and the like.

Wallet value unit comprises a value unit type that may be available in the wallet container 702 in the value unit conversion and utilization product 711.

What is claimed is:

1. A system for user-based customization of a transaction product comprising:
a network-connected product configuration computer comprising a processor, a memory, and a first plurality of programming instructions, the first plurality of programming instructions, when executed by the processor, cause the processor to:
create a plurality of products corresponding to an electronic wallet, each product comprising, at least one product account, each product account associated with one type of value unit of a plurality of value units that can be calculated to have at least one exchange rate;
receive a plurality of connections, over a network, from a plurality of partner user devices;
receive a plurality of connections, over the network, from a plurality of external services;
generate, by the product creator, a graphical user interface, the graphical user interface displayed on a graphical display associated with a first partner user device, of the plurality of partner user devices, the graphical user interface operable to:
configure instrument product data;
submit change requests, the change requests associated with, at least, a plurality of limitations;
receive, at the product creator, the instrument product data, from the graphical user interface of the first partner user device, the instrument product data defining the creation of a first product and comprising configuration, the configuration comprising the plurality of limitations defining limits for at least one electronic transaction, the at least one electronic transaction associated with at least one external services wherein the plurality of limitations comprise, at least, an allowed quantity, at least one allowed geography, blocked external services, and a velocity;
wherein at least one limitation, of the plurality of limitations, is associated with the at least one electronic transaction;

a transaction product computer comprising a processor, a memory, and a second plurality of programming instructions, the second plurality of programming instructions, when executed by the processor, cause the processor to:
  receive a plurality of connections from the plurality of external services;
  receive, from the first partner user device, a first predefined sequence to determine an order of usage for the at least one product account;
  send the first predefined sequence, the at least one product account, and a cumulative quantity of the plurality of value units associated with the at least one product account, to the graphical user interface associated with the first partner user device, the graphical user interface operable to enable the at least one product account to be customized through a toggle that prioritizes each value unit corresponding to at least one electronic transaction type to be at least one of exchanged, withdrawn or used for purchases;
  receive the at least one electronic transaction from a first external service of the at least one external services;
  match a value unit type of the at least one electronic transaction with a value unit type of the at least one product account within the predefined wallet sequence;
  limit the at least one electronic transaction based on the at least one limitation;
  receive, from the first partner user device, a customization for the at least one matched product account;
  create a secondary sequence comprising the customized at least one matched product account, the second sequence determining an order of usage of the customized at least one matched product account, wherein the order of usage of the customized at least one matched product account is based on a sequence of the customized at least one matched product account consistent with the order of usage defined within the first predefined sequence, wherein the secondary sequence is transformed into at least one application programming interface (API) used to create multiple utilization products for the first partner user device and other partner user devices;
  create a utilization product defining an order of usage for processing the limited at least one electronic transaction based on the value unit type of the at least one electronic transaction, the order of usage determined by a sequence of: the customized at least one matched product account from the secondary sequence followed by remaining product accounts from the first predefined sequence; and
  display the utilization product on the graphical user interface of the first partner user device.

2. The system of claim 1, wherein the instrument product data comprises a plurality of parameters associated with the first partner user device.

3. The system of claim 2, wherein the at least one limitation further comprises risk data, and wherein the second plurality of programming instructions when executed by the processor, cause the processor to:
  limit a one time, one day, or seven-day:
    withdrawal amount;
    purchase amount;
    adjustment amount;
    refund count; or
    refund amount;
  limit a number of pin failures;
  limit blocked categories; or
  any combination thereof.

4. The system of claim 1, wherein the graphical user interface is operable to submit change request for limiting transaction on a per-transaction basis for the at least one electronic transaction.

5. A computer-implemented method for user-based customization of a transaction product comprising:
  creating, at a network-connected product configuration computer, a plurality of products corresponding to an electronic wallet, each product comprising, at least one product account, each product account associated with one type of value unit of a plurality of value units that can be calculated to have at least one exchange rate;
  receiving, at the network-connected product configuration computer, a plurality of connections, over a network, from a plurality of partner user devices;
  receive, at the network-connected product configuration computer, a plurality of connections, over the network, from a plurality of external services;
  generating, by a product creator, a graphical user interface, the graphical user interface displayed on a graphical display associated with a first partner user device, of the plurality of partner user devices, the graphical user interface operable to:
    configure instrument product data;
    submit change requests, the change requests associated with, at least, a plurality of limitations;
  receiving, at the product creator, the instrument product data, from the graphical user interface of the first partner user device, the instrument product data defining the creation of a first product and comprising configuration, the configuration comprising the plurality of limitations defining limits for at least one electronic transaction, the at least one electronic transaction associated with at least one external services wherein the plurality of limitations comprise, at least, an allowed quantity, at least one allowed geography, blocked external services, and a velocity;
  wherein at least one limitation, of the plurality of limitations, is associated with the at least one electronic transaction;
  receiving, at a transaction product computer, a plurality of connections from the plurality of external services;
  receiving, at the transaction product computer, from the first partner user device, a first predefined sequence to determine an order of usage for the at least one product account;
  sending, by the transaction product computer, the first predefined sequence, the at least one product account, and a cumulative quantity of the plurality of value units associated with the at least one product account, to the graphical user interface associated with the first partner user device, the graphical user interface operable to enable the at least one product account to be customized through a toggle that prioritizes each value unit corresponding to at least one electronic transaction type to be at least one of exchanged, withdrawn or used for purchases;
  receiving, at the transaction product computer, the at least one electronic transaction from a first external service of the at least one external services;
  matching, by the transaction product computer, a value unit type of the at least one electronic transaction with a value unit type of the at least one product account within the predefined wallet sequence;

limiting, by the transaction product computer, the at least one electronic transaction based on the at least one limitation;

receiving, at the transaction product computer, from the first partner user device, a customization for the at least one matched product account;

creating, by the transaction product computer, a secondary sequence comprising the customized at least one matched product account, the second sequence determining an order of usage of the customized at least one matched product account, wherein the order of usage of the customized at least one matched product account is based on a sequence of the customized at least one matched product account consistent with the order of usage defined within the first predefined sequence, wherein the secondary sequence is transformed into at least one application programming interface (API) used to create multiple utilization products for the first partner user device and other partner user devices;

creating, by the transaction product computer, a utilization product defining an order of usage for processing the limited at least one electronic transaction based on the value unit type of the at least one electronic transaction, the order of usage determined by a sequence of: the customized at least one matched product account& from the secondary sequence followed by remaining product accounts from the first predefined sequence; and display the utilization product on the graphical user interface of the first partner user device.

6. The method of claim 5, wherein the plurality of limitations further comprises, at least, risk data, the risk data comprising:

a one time, one day, or seven-day:
- withdrawal amount;
- purchase amount;
- adjustment amount;
- refund count; or
- refund amount;

a number of pin failures;

blocked categories; or any combination thereof.

7. The method of claim 5, wherein the graphical user interface is operable to submit change request for configuration on a per-transaction basis for the at least one electronic transaction.

* * * * *